(12) United States Patent
Miyamoto

(10) Patent No.: US 10,142,593 B2
(45) Date of Patent: Nov. 27, 2018

(54) INFORMATION PROCESSING DEVICE, INFORMATION PROCESSING METHOD, CLIENT DEVICE, SERVER DEVICE, AND INFORMATION PROCESSING SYSTEM

(71) Applicant: SONY CORPORATION, Tokyo (JP)

(72) Inventor: Kohei Miyamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/558,884

(22) PCT Filed: Dec. 29, 2015

(86) PCT No.: PCT/JP2015/086577
§ 371 (c)(1),
(2) Date: Sep. 15, 2017

(87) PCT Pub. No.: WO2016/151974
PCT Pub. Date: Sep. 29, 2016

(65) Prior Publication Data
US 2018/0070054 A1   Mar. 8, 2018

(30) Foreign Application Priority Data

Mar. 24, 2015   (JP) ................. 2015-061305

(51) Int. Cl.
*H04N 7/14* (2006.01)
*H04N 7/15* (2006.01)
(Continued)

(52) U.S. Cl.
CPC ........... *H04N 7/152* (2013.01); *G06F 13/00* (2013.01); *G10L 25/57* (2013.01); *G10L 25/84* (2013.01); *H04L 65/403* (2013.01); *H04N 7/0117* (2013.01); *H04N 7/14* (2013.01); *H04N 7/147* (2013.01); *G10L 15/25* (2013.01); *G10L 17/005* (2013.01); *G10L 2025/783* (2013.01)

(58) Field of Classification Search
CPC ....................................................... H04N 7/14
See application file for complete search history.

(56) References Cited

U.S. PATENT DOCUMENTS 7,768,543 B2 * 8/2010 Christiansen ..... H04L 29/06027
348/14.08
9,118,940 B2 * 8/2015 Valentine ............... H04N 7/152
(Continued)

FOREIGN PATENT DOCUMENTS

JP   08-294102 A   11/1996
JP   2007-081863 A   3/2007
(Continued)

OTHER PUBLICATIONS

International Search Report and Written Opinion of PCT Application No. PCT/JP2015/086577, dated Mar. 8, 2016, 09 pages ISRWO.

*Primary Examiner* — Olisa Anwah
(74) *Attorney, Agent, or Firm* — Chip Law Group

(57) ABSTRACT

There is provided an information processing device including a video quality control unit configured to control, on the basis of a degree of importance of a user based on whether or not the user of a client device makes utterance, a quality of a video of the user transmitted from the client device to a server device.

18 Claims, 14 Drawing Sheets

(51) Int. Cl.
*G06F 13/00* (2006.01)
*H04N 7/01* (2006.01)
*G10L 25/57* (2013.01)
*H04L 29/06* (2006.01)
*G10L 25/84* (2013.01)
*G10L 15/25* (2013.01)
*G10L 17/00* (2013.01)
*G10L 25/78* (2013.01)

(56) References Cited

U.S. PATENT DOCUMENTS 9,313,454 B2 * 4/2016 Lalonde .................. H04N 7/147
9,379,999 B2 * 6/2016 Lynch ..................... H04L 47/19

FOREIGN PATENT DOCUMENTS

| JP | 2007-300452 A | 11/2007 |
| JP | 2011-244455 A | 12/2011 |
| JP | 2013-126103 A | 6/2013 |
| JP | 2014-175961 A | 9/2014 |

* cited by examiner

INFORMATION PROCESSING DEVICE, INFORMATION PROCESSING METHOD, CLIENT DEVICE, SERVER DEVICE, AND INFORMATION PROCESSING SYSTEM

CROSS REFERENCE TO RELATED APPLICATIONS

This application is a U.S. National Phase of International Patent Application No. PCT/JP2015/086577 filed on Dec. 29, 2015, which claims priority benefit of Japanese Patent Application No. JP 2015-061305 filed in the Japan Patent Office on Mar. 24, 2015. Each of the above-referenced applications is hereby incorporated herein by reference in its entirety.

TECHNICAL FIELD

The present disclosure relates to an information processing device, an information processing method, a client device, a server device, and an information processing system.

BACKGROUND ART

In recent years, various technologies have been disclosed as a technology for controlling a video. For example, there is disclosed a technology for constantly monitoring a network band and controlling an amount of data of a video adaptively transmitted to a network on the basis of a monitoring result of the network band (see, for example, Patent Literature 1). Further, there is disclosed a technology for detecting an utterer from a plurality of users and controlling capturing or display of a video in accordance with the detected utterer (see, for example, Patent Literature 2).

CITATION LIST

Patent Literature

Patent Literature 1: JP 2014-175961A
Patent Literature 2: JP 2011-244455A

DISCLOSURE OF INVENTION

Technical Problem

However, it is desirable to provide a technology capable of preventing deterioration in a video quality desired by a user while suppressing an amount of data of a video transmitted to a communication line.

Solution to Problem

According to the present disclosure, there is provided an information processing device including a video quality control unit configured to control, on the basis of a degree of importance of a user based on whether or not the user of a client device makes utterance, a quality of a video of the user transmitted from the client device to a server device.

According to the present disclosure, there is provided an information processing method including controlling, on the basis of a degree of importance of a user based on whether or not the user of a client device makes utterance, a quality of a video of the user transmitted from the client device to a server device.

According to the present disclosure, there is provided a client device including a video quality control unit configured to control, on the basis of a degree of importance of a user based on whether or not the user makes utterance, a quality of a video of the user transmitted to a server device.

According to the present disclosure, there is provided a server device including: a data analysis unit configured to calculate, regarding each of a plurality of client devices, the degree of importance of a user on the basis of whether or not the user makes utterance; and a video quality instruction unit configured to issue, regarding each of the plurality of client devices, an instruction on a quality of a video of the user transmitted from the client device to the server device on the basis of the degree of importance.

According to the present disclosure, there is provided an information processing system including: a plurality of client devices; and a server device. Each of the plurality of client devices includes a video quality control unit configured to control, on the basis of a degree of importance of a user based on whether or not the user makes utterance, a quality of a video of the user transmitted from the client device to the server device.

Advantageous Effects of Invention

As described above, according to the present disclosure, there is provided a technology capable of preventing deterioration in a video quality desired by a user while suppressing an amount of data of a video transmitted to a communication line. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
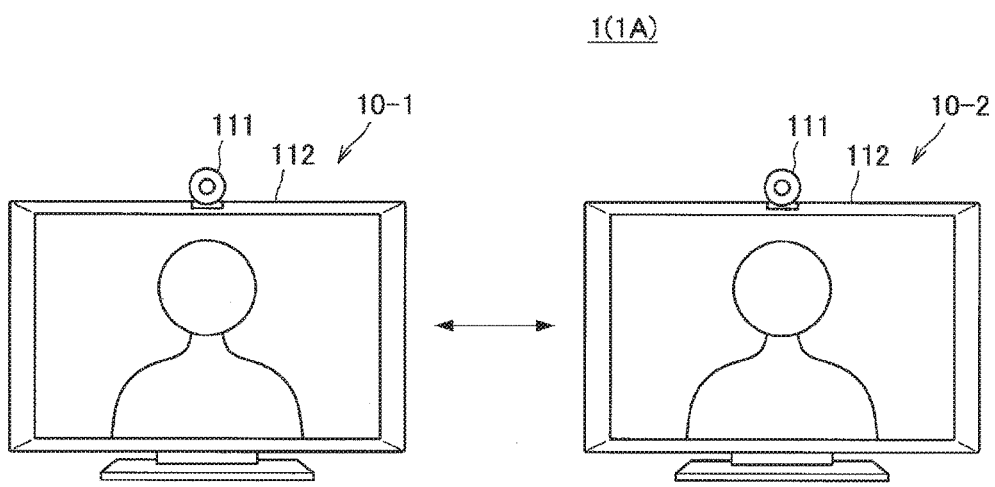
FIG. 1 is a diagram illustrating a first configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in the present specification and the drawings, a plurality of constituent elements that have substantially the same function and configuration are distinguished from each other by attaching different alphabets after the same reference sign in some cases. Further, similar constituent elements in different embodiments are distinguished from each other by attaching different alphabets after the same reference sign in some cases. However, in a case where it is unnecessary to distinguish a plurality of constituent elements that have substantially the same function and configuration in particular, only the same reference sign is attached.

Note that description will be provided in the following order.

1. Embodiment of present disclosure
1.1. System configuration example
1.2. Functional configuration example of client device
1.3. Functional configuration example of server device
1.4. Specific description
1.5. Operation example of client device
1.6. Operation example of server device
1.7. Hardware configuration example of client device
1.8. Hardware configuration example of server device
2. Conclusion

<1. EMBODIMENT OF PRESENT DISCLOSURE>

[1.1. System Configuration Example]

First, a configuration example of an information processing system according to an embodiment of the present disclosure will be described with reference to the drawings. FIG. 1 is a diagram illustrating a first configuration example of an information processing system according to an embodiment of the present disclosure. As illustrated in FIG. 1, an information processing system 1A according to an embodiment of the present disclosure includes a terminal 10-1 and a terminal 10-2. Each of the terminals 10-1 and 10-2 includes a camera 111 and a display unit 112. The terminal 10-1 and the terminal 10-2 transmit videos of users captured by the cameras 111 to each other. Further, each of the terminals 10-1 and 10-2 displays the received video on the display unit 112.

Figure 2:
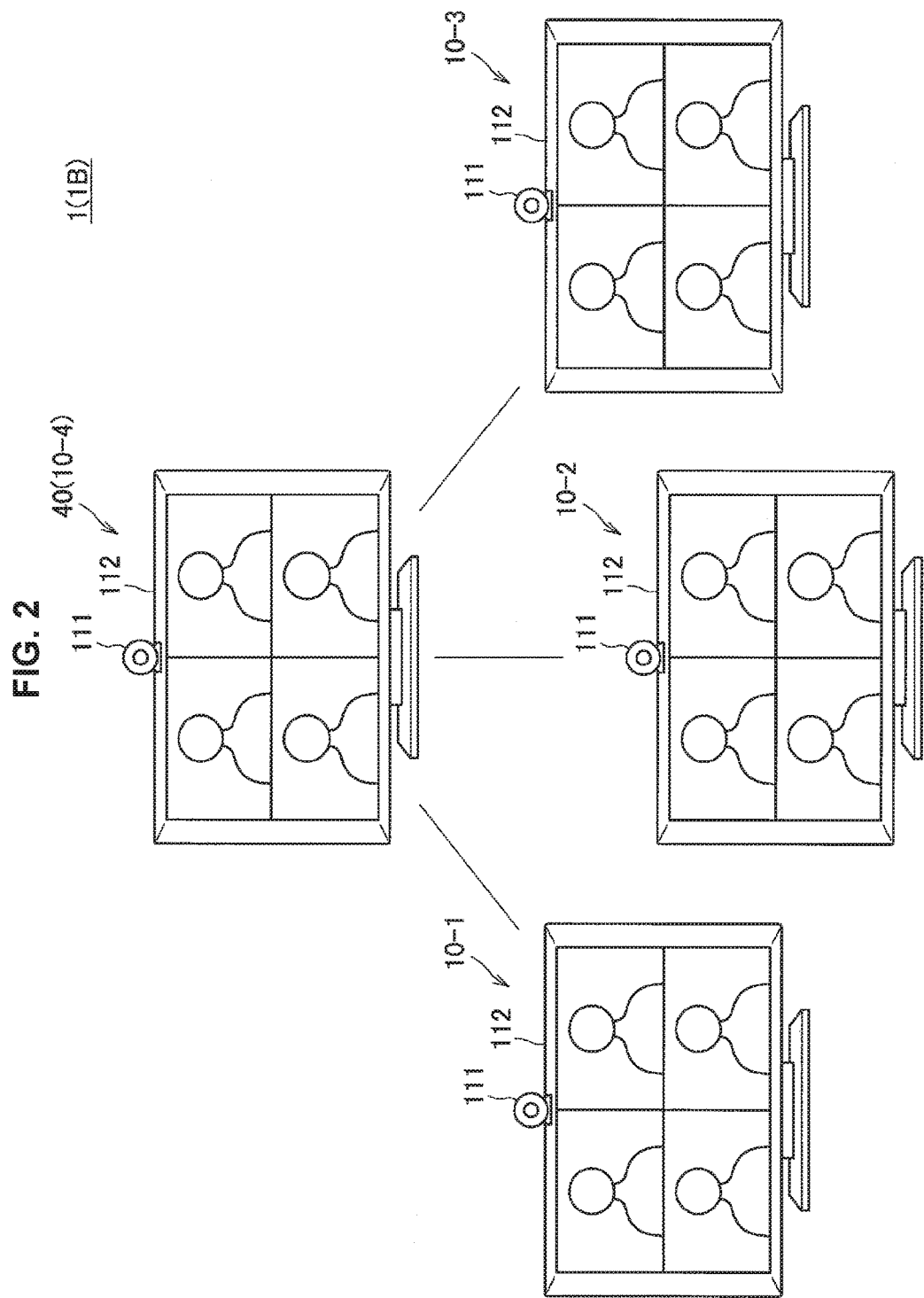
FIG. 2 is a diagram illustrating a second configuration example of an information processing system according to an embodiment of the present disclosure.

FIG. 2 is a diagram illustrating a second configuration example of an information processing system 1 according to an embodiment of the present disclosure. As illustrated in FIG. 2, an information processing system 1B according to an embodiment of the present disclosure includes client devices 10-1 to 10-4. The client device 10-4 also functions as a server device 40. Each of the client devices 10-1 to 10-4 includes a camera 111 and a display unit 112. Each of the client devices 10-1 to 10-4 transmits a video of a user captured by the camera 111 to the server device 40. Further, the client devices 10-1 to 10-4 display, on the display units 112, videos of the respective client devices 10-1 to 10-4 received from the server device 40.

Figure 3:
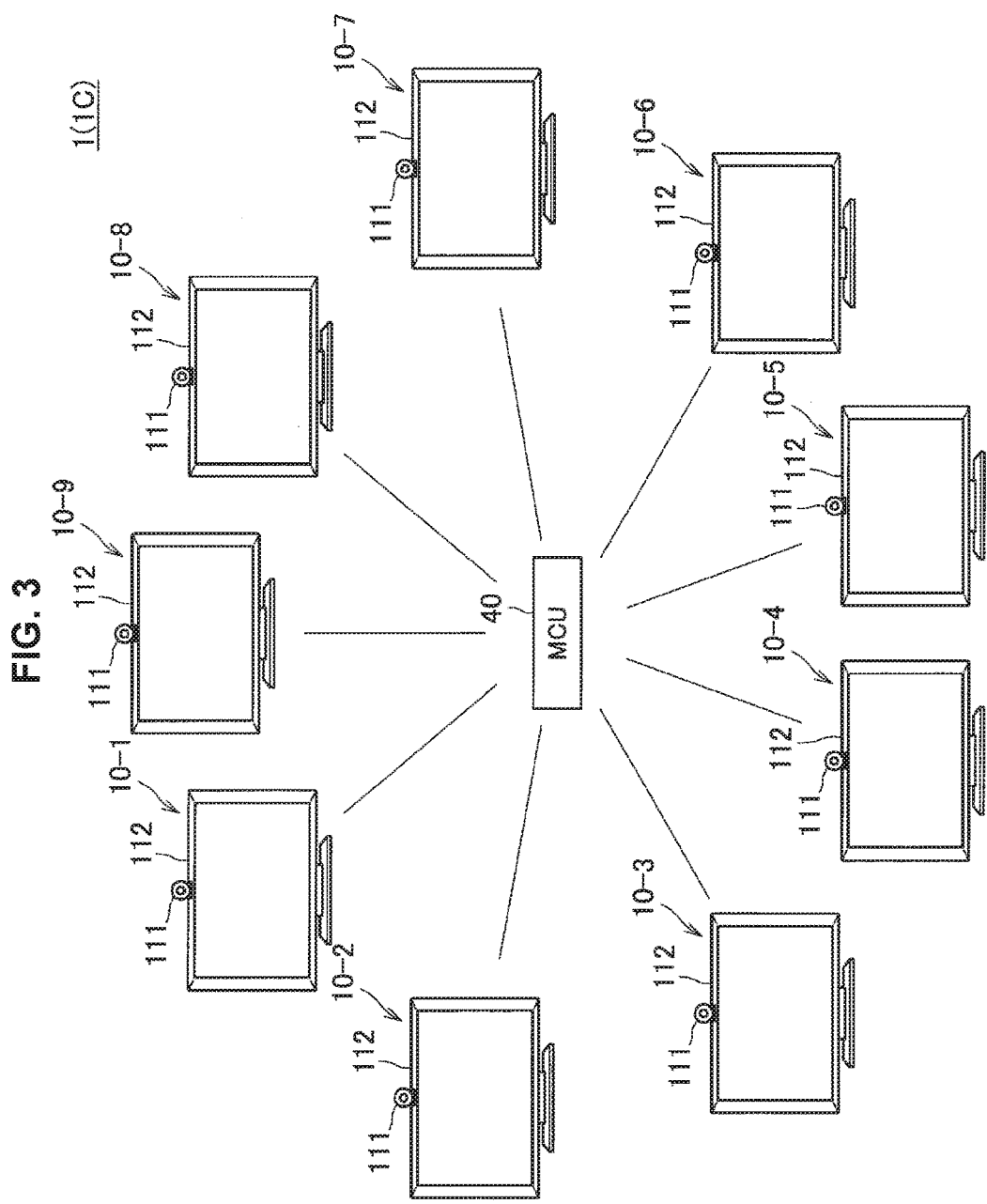
FIG. 3 is a diagram illustrating a third configuration example of an information processing system according to an embodiment of the present disclosure.

FIG. 3 is a diagram illustrating a third configuration example of the information processing system 1 according to an embodiment of the present disclosure. As illustrated in FIG. 3, an information processing system IC according to an embodiment of the present disclosure includes client devices 10-1 to 10-9 and a server device 40. As illustrated in FIG. 3, the server device 40 may be a multipoint control unit (MCU). Each of the client devices 10-1 to 10-9 includes a camera 111 and a display unit 112. Each of the client devices 10-1 to 10-9 transmits a video of a user captured by the camera 111 to the server device 40. Further, the client devices 10-1 to 10-9 display, on the display units 112, videos of the respective client devices 10-1 to 10-9 received from the server device 40.

Figure 4:
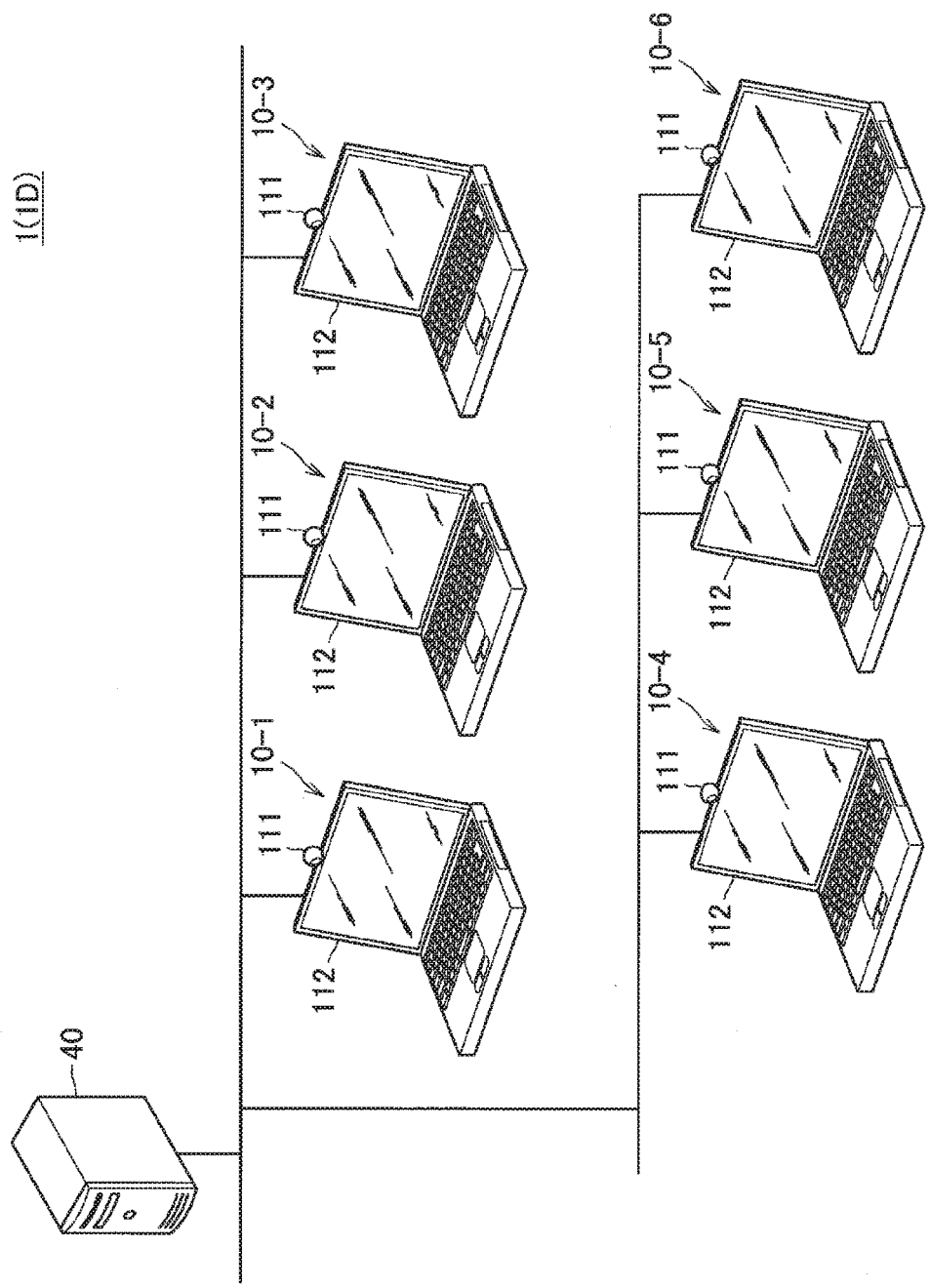
FIG. 4 is a diagram illustrating a fourth configuration example of an information processing system according to an embodiment of the present disclosure.

FIG. 4 is a diagram illustrating a fourth configuration example of the information processing system 1 according to the embodiment of the present disclosure. As illustrated in FIG. 4, an information processing system 1D according to an embodiment of the present disclosure includes client devices 10-1 to 10-6 and a server device 40. Each of the client devices 10-1 to 10-6 includes a camera 111 and a display unit 112. Each of the client devices 10-1 to 10-6 transmits a video of a user captured by the camera 111 to the server device 40 via a communication line. Further, the client devices 10-1 to 10-6 display, on the display units 112, videos of the respective client devices 10-1 to 10-6 received from the server device 40 via the communication line.

Note that, in an embodiment of the present disclosure, videos may be transmitted/received by the client devices (terminals) 10 as illustrated in FIGS. 1 to 4, and information other than videos may also be transmitted/received by the client devices 10. For example, sound of users collected by the client devices 10 may also be gathered by the server device 40 and be output by the client devices 10. In such a case, the information processing system 1 can function as a video conference system.

In the present specification, an example where the information processing system 1 is applied to a video conference system will be mainly described. Note that, in the following description, a case where the information processing system 1B is configured by the second configuration example of the information processing system 1 illustrated in FIG. 2 will be described as an example. However, the configuration example of the information processing system 1 according to the embodiment of the present disclosure is not limited to the second configuration example of the information processing system 1 illustrated in FIG. 2.

Hereinabove, the configuration example of the information processing system 1 according to the embodiment of the present disclosure has been described.

[1.2. Functional Configuration Example of Client Device]

Figure 5:
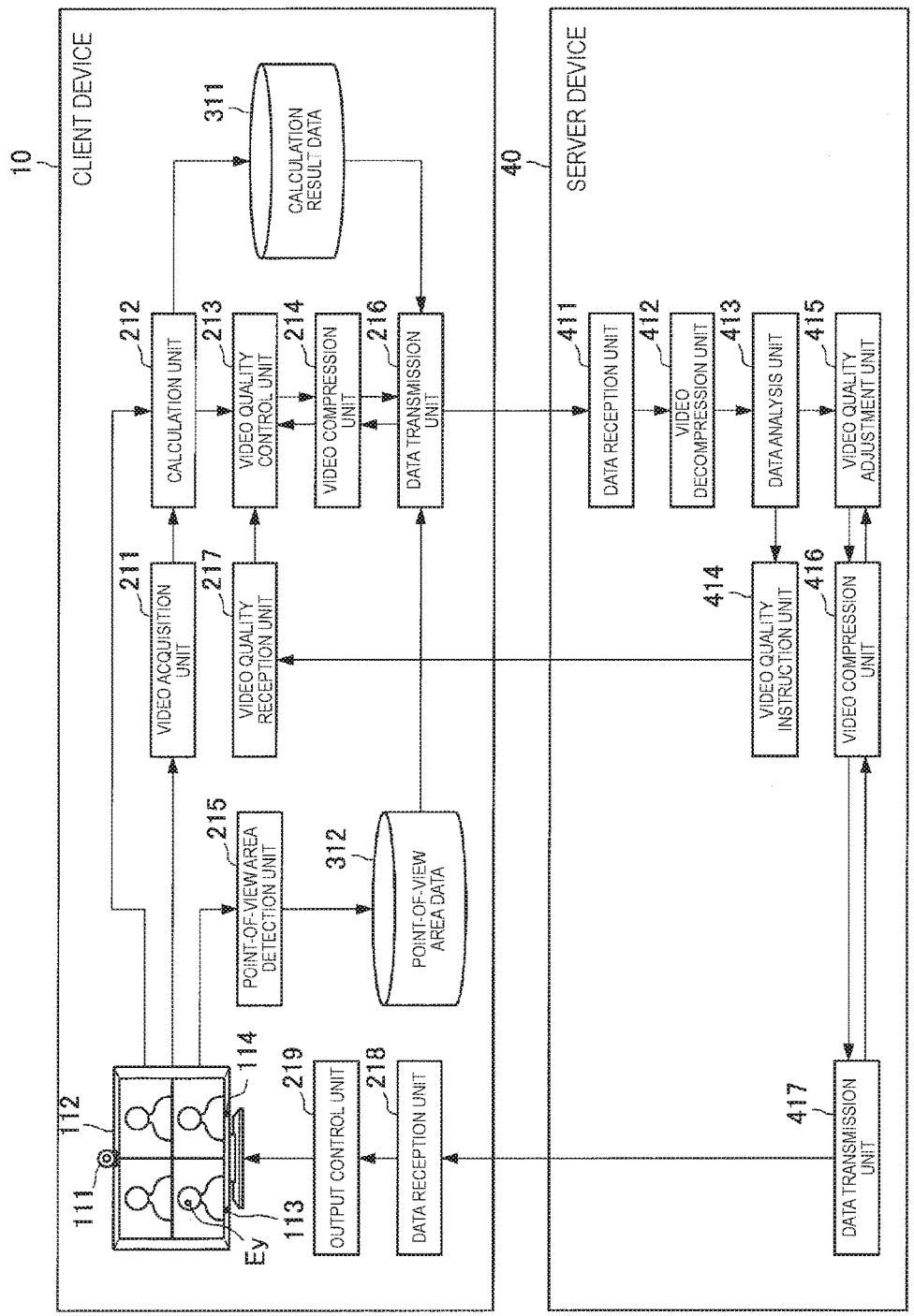
FIG. 5 is a block diagram illustrating a functional configuration example of an information processing system according to an embodiment of the present disclosure.

Next, a functional configuration example of the information processing system 1 according to an embodiment of the present disclosure will be described. FIG. 5 is a block diagram illustrating a functional configuration example of the information processing system 1 according to the embodiment of the present disclosure. As illustrated in FIG. 5, the information processing system 1 according to the embodiment of the present disclosure includes a client device 10 and a server device 40. Note that, in the example illustrated in FIG. 5, a single client device 10 is provided for convenience of a sheet of paper. However, in the second configuration example of the information processing system 1 illustrated in FIG. 2, a plurality of client devices 10 exist.

The client device 10 includes a camera 111, a display unit 112, an eye area image capturing unit 113, and a microphone 114. Further, the client device 10 includes a video acquisition unit 211, a calculation unit 212, a video quality control unit 213, a video compression unit 214, a point-of-view area detection unit 215, a data transmission unit 216, a video quality reception unit 217, a data reception unit 218, an output control unit 219, a storage unit of calculation result data 311, and a storage unit of point-of-view area data 312.

In the following description of each function block that the client device 10 has, the wording "client device 10" means a client device 10 including the function block therein. The camera 111 captures an image of a user of the client device 10 (hereinafter, also simply referred to as "user"), thereby obtaining a video of the user. The video of the user obtained by the camera 111 is output to the video acquisition unit 211. Although a single camera 111 is provided in the example illustrated in FIG. 5, a plurality of cameras 111 may be provided.

The video acquisition unit 211 performs processing for converting the video of the user captured by the camera 111 into a video of a predetermined video format, a predetermined resolution, and a predetermined frame rate. Further, in a case where the video acquisition unit 211 acquires videos from a plurality of cameras 111, the video acquisition unit 211 may have a stitching function of combining the videos obtained from the respective plurality of cameras 111 or may have a switching function of selecting a single video from the videos obtained from the respective plurality of cameras 111. The video acquired by the video acquisition unit 211 is output to the calculation unit 212.

Further, the microphone 114 obtains sound information by collecting surrounding sound. The sound information acquired by the microphone 114 is output to the calculation unit 212. Note that, although a single microphone 114 is provided in the example illustrated in FIG. 5, a plurality of microphones 114 may be provided. Further, a microphone array may be used, instead of the microphone 114.

The calculation unit 212 calculates a degree of importance of a user on the basis of whether or not the user makes utterance. A range of the degree of importance is not particularly limited, and may be, for example, from "0" to "100". Whether or not the user makes utterance may be calculated by any method. For example, the calculation unit 212 may determine whether or not the user makes utterance on the basis of a video captured by the camera 111 or sound information collected by the microphone 114.

For example, in an environment in which there is no sound source having volume exceeding predetermined volume other than sound uttered by the user, whether or not the user makes utterance may be determined in accordance with whether or not volume of the sound information collected by the microphone 114 exceeds a threshold. On the contrary, in an environment in which there is a sound source having volume exceeding the predetermined volume other than sound uttered by the user, whether or not the user makes utterance may be determined by feature analysis of the sound information collected by the microphone 114, feature analysis of the video captured by the camera 111, or the like as disclosed in, for example, JP 2007-156493A.

Further, a method of calculating the degree of importance is also not particularly limited. The method of calculating the degree of importance may be set by the user in advance or may be dynamically changed. For example, it is considered that a degree of importance of a user who makes utterance is higher than that of a user who does not make utterance, and therefore the calculation unit 212 only needs to increase a degree of importance of the user in a case where a user makes utterance, as compared to a case where the user does not make utterance.

Figure 6:
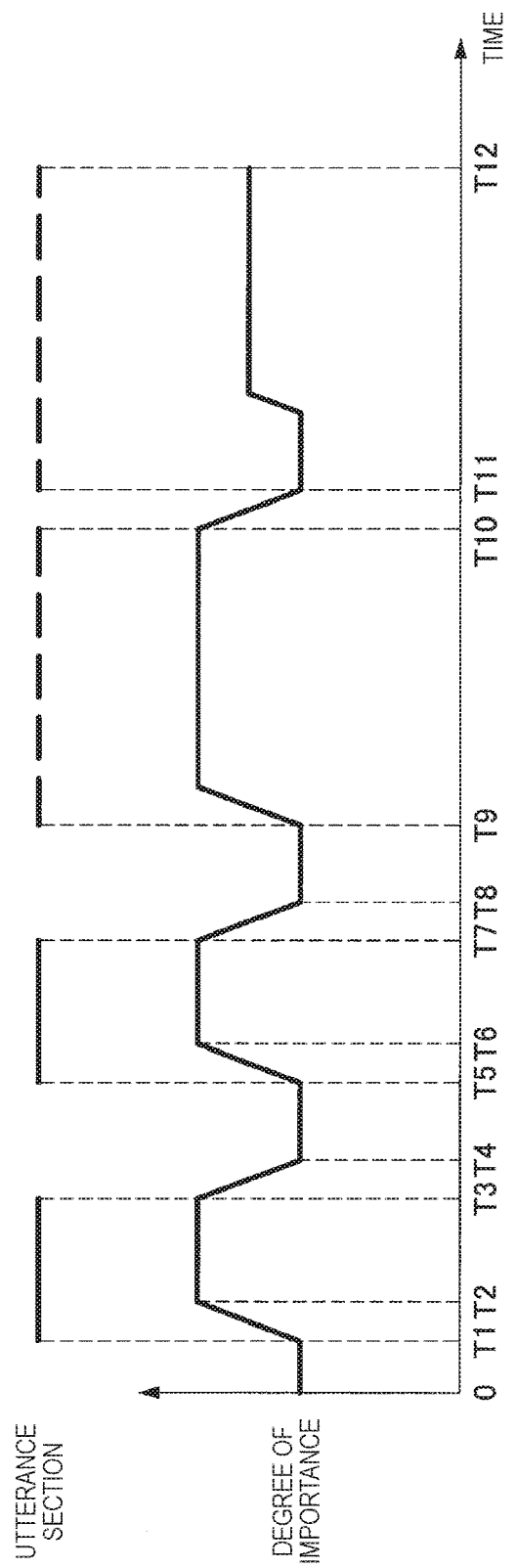
FIG. 6 is a diagram illustrating an example of a relationship between an utterance section and a degree of importance.

Alternatively, the calculation unit 212 may calculate the degree of importance of the user on the basis of at least one of a length of continuous utterance made by the user of the client device 10, content of an utterance, and an interval between utterances. FIG. 6 is a diagram illustrating an example of a relationship between an utterance section and a degree of importance. As illustrated in FIG. 6, when a user starts making utterance, the calculation unit 212 may gradually increase a degree of importance (times T1 to T2, T5 to T6). Further, the calculation unit 212 may keep the degree of importance constant when a length of continuous utterance made by the user exceeds a predetermined length (times T2 to T3, T6 to T7).

Meanwhile, when the user terminates utterance, the calculation unit 212 may gradually decrease the degree of importance (times T3 to T4, T7 to T8, T10 to T11). Further, the calculation unit 212 may keep the degree of importance constant when a length of continuous utterance made by the user exceeds a predetermined length (times T4 to T5, T8 to T9).

Further, the calculation unit 212 does not need to cause the degree of importance to completely follow whether or not utterance is made. For example, the calculation unit 212 keeps the degree of importance constant in a case where intervals between utterances made by the user is shorter than a predetermined interval (T9 to T10). Further, the calculation unit 212 may increase the degree of importance as importance of content of an utterance is higher. FIG. 6 illustrates an example where the importance of content of an utterance in the times T11 to T12 is lower than a predetermined importance and therefore the calculation unit 212 calculates a low degree of importance. For example, the importance of content of an utterance can be calculated by a method disclosed in, for example, JP 2000-075892A.

The degree of importance calculated as described above is stored as the calculation result data 311. The video quality control unit 213 acquires the calculation result data 311 as a degree of importance and controls a quality of a video transmitted from the client device 10 to the server device 40 on the basis of the acquired degree of importance. For example, the video quality control unit 213 only needs to increase the quality of the video of the user as the degree of importance of the user is higher.

Further, an instruction on the quality of the video of the user is issued from the server device 40 in some cases. In such a case, the video quality control unit 213 may determine whether to follow the quality on which the instruction is issued from the server device 40. That is, in a case where the video quality control unit 213 determines to follow the quality on which the instruction is issued from the server device 40, the video quality control unit 213 controls the quality of the video so that the quality becomes the quality on which the instruction is issued from the server device 40, and, in a case where the video quality control unit 213 determines not to follow the quality on which the instruction is issued from the server device 40, the video quality control unit 213 may control the quality of the video so that the quality becomes a quality calculated by the calculation unit 212.

More specifically, the video quality control unit 213 may determine whether to follow the quality of the video on which the instruction is issued from the server device 40 on the basis of the number of client devices 10 connected to the server device 40. For example, in a case where the number of client devices 10 connected to the server device 40 exceeds a predetermined number, the video quality control unit 213 controls the quality of the video so that the quality becomes the quality on which the instruction is issued from the server device 40, and, in a case where the number of client devices 10 connected to the server device 40 is a predetermined number or less, the video quality control unit 213 may control the quality of the video so that the quality becomes the quality calculated by the calculation unit 212.

Further, the video quality control unit 213 may determine whether to follow the quality of the video on which the instruction is issued from the server device 40 on the basis of a line of sight of the user of each of the client devices 10-1 to 10-4. For example, in a case where the number of lines of sight turned on the video of the user exceeds a predetermined number, the video quality control unit 213 may control the quality of the video so that the quality becomes the quality on which the instruction is issued from the server device 40, and, in a case where the number of lines of sight turned on the video of the user is a predetermined number or less, the video quality control unit 213 may control the quality of the video so that the quality becomes the quality calculated by the calculation unit 212.

Alternatively, it is also considered that an instruction on the quality of the video is forcibly issued from the server device 40. In such a case, the video quality control unit 213 only needs to control the quality of the video so that the quality becomes the quality on which the instruction is issued from the server device 40. Note that the instruction on the video quality from the server device 40 may be received by the video quality reception unit 217.

Further, the video quality control unit 213 may control the quality of the video of the user transmitted from the client device 10 to the server device 40 further on the basis of a band of a communication line of the video of the user of the client device 10. For example, the video quality control unit 213 only needs to control the quality of the video so that the quality of the video of the user transmitted from the client device 10 to the server device 40 is increased as the band of the communication line of the video of the user of the client device 10 is wider. Further, in a case where the video quality control unit 213 is required by the data transmission unit 216 to reduce the quality of the video, the video quality control unit 213 may reduce the video quality.

The video compression unit 214 encodes the video of the user in accordance with control by the video quality control unit 213. At this time, in a case where time required to perform encoding exceeds predetermined necessary time, the video compression unit 214 may change encoding processing so as to reduce the time required to perform encoding. Further, the video compression unit 214 may notify the video quality control unit 213 of the changed encoding processing. With this, the video quality control unit 213 can control the video compression unit 214 so that the video compression unit 214 performs the changed encoding processing.

The point-of-view area detection unit 215 detects an area in which a point of view Ey exists from an eye area of the user captured as an image by the eye area image capturing unit 113. At that time, the video of the user captured by the camera 111 may also be used to detect a point-of-view area. A method of detecting the point-of-view area is not particularly limited, and, for example, a method disclosed in JP H10-154220A can be used. Note that an area including a point of view set by the user in advance may be set as the point-of-view area. With this, it is possible to control a video quality of the area including the point of view set by the user in advance.

The point-of-view area detected as described above is stored as the point-of-view area data 312. The data transmission unit 216 transmits the sound information, the video of the user, the calculation result data 311, and the point-of-view area data 312 to the server device 40. The video of the user, the calculation result data 311, and the point-of-view area data 312 may be appropriately integrated by the data transmission unit 216 and be then transmitted to the server device 40. Further, the data transmission unit 216 monitors the band of the communication line with the server device 40, and, in a case where the band is narrower than a threshold, the data transmission unit 216 may require the video quality control unit 213 to reduce the quality of the video.

Note that part or all of the function blocks that the client device 10 has (for example, video acquisition unit 211, calculation unit 212, video quality control unit 213, video compression unit 214, point-of-view area detection unit 215, and output control unit 219) may exist in another device. That is, part or all of those function blocks (information processing device) may be incorporated into one of the client device 10, the server device 40, and the client device 10 and one or more external devices (not illustrated) existing outside the client device 10 or may be distributed and incorporated into two or more thereof.

Hereinabove, the functional configuration example of the client device 10 according to the embodiment of the present disclosure has been described.

[1.3. Functional Configuration Example of Server Device]

As illustrated in FIG. 5, the server device 40 includes a data reception unit 411, a video decompression unit 412, a data analysis unit 413, a video quality instruction unit 414, a video quality adjustment unit 415, a video compression unit 416, and a data transmission unit 417. The data reception unit 411 receives sound information, a video of a user, the calculation result data 311, and the point-of-view area data 312 from each of the client devices 10-1 to 10-4.

The video decompression unit 412 decodes the video of the user of each of the client devices 10-1 to 10-4. The data reception unit 411 and the video decompression unit 412 may operate in parallel to correspond to each of the client devices 10-1 to 10-4 or may operate in series to successively correspond to the client devices 10-1 to 10-4.

The data analysis unit 413 calculates a degree of importance of the user of each of the client devices 10-1 to 10-4 on the basis of whether or not the user makes utterance. For example, as shown in the following expression (1), the data analysis unit 413 may calculate a new degree of importance of the user of each of the client devices 10-1 to 10-4 by multiplying the degree of importance based on whether or not the user makes utterance by a weighting coefficient for each client device 10.

$$F(A) = Dn \times xn \qquad (1)$$

Herein, the symbol "F" denotes a degree of importance of each client device 10 calculated by the data analysis unit 413. The symbol "A" denotes the calculation result data 311 and is received from the client device 10. The symbol "D"

denotes a weighting coefficient for each client device 10. The symbol "x" denotes a degree of importance of each client device 10 and is acquired from the calculation result data 311. The symbol "n" is identification information of the client device 10. Note that the weighting coefficient may be determined in advance or may be dynamically changed.

Note that a method using a weighting coefficient has been described in the above example. However, the degree of importance of each client device 10 may be calculated by another method. For example, the data analysis unit 413 may summarize content of utterances of the users of the respective client devices 10-1 to 10-4 by performing sound recognition processing on sound information received from each of the client devices 10-1 to 10-4, analyze a flow and context of conversation in the whole content of the utterances, and calculate the degree of importance of each client device 10 on the basis of an analysis result. The sound recognition processing may be performed by the client devices 10-1 to 10-4.

Alternatively, the data analysis unit 413 may calculate the degree of importance of the user of each of the client devices 10-1 to 10-4 on the basis of a line of sight of the user of each of the client devices 10-1 to 10-4. More specifically, it is considered that a video of a user on which a larger number of lines of sight of users are turned has a higher degree of importance, and therefore the data analysis unit 413 may increase a degree of importance of a user appearing in a video on which a larger number of lines of sight are turned.

For example, as shown in the following expression (2), the data analysis unit 413 may calculate the degree of importance of the user of each of the client devices 10-1 to 10-4 on the basis of the number of lines of sight turned on a video.

$$F(B) = d \times e \quad (2)$$

Herein, as in the above case, the symbol "F" denotes a degree of importance of each client device 10 calculated by the data analysis unit 413. The symbol "B" denotes the point-of-view area data 312 and is received from the client device 10. The symbol "d" denotes the number of lines of sight of other users turned on a video of the user of the client device 10. The symbol "e" is a value obtained by subtracting "1" from the number of client devices 10 connected to the server device 40. With this, the client device 10 displaying the video of the user is not counted as the number of lines of sight.

Further, the expression (2) is developed, and the degree of importance F(B) may be multiplied by the weighting coefficient for each client device 10 or may be adjusted in a time-axis direction (For example, the degree of importance F(B) may have a predetermined inclination in a time direction.). Further, the degree of importance F(A) may be used alone, the degree of importance F(B) may be used alone, or both the degree of importance F(A) and the degree of importance F(B) may be used as shown in the following expression (3).

$$F = a \times F(A) + b \times F(B) \quad (3)$$

Herein, as in the above case, the symbol "F" denotes a degree of importance for each client device 10 calculated by the data analysis unit 413. The symbols "a" and "b" denote weighting coefficients. Note that the weighting coefficients may be determined in advance or may be dynamically changed. In a case where the expression (3) is used, setting "a" to "0" makes it possible to ignore the degree of importance F(A) based on whether or not the user makes utterance, and setting "b" to "0" makes it possible to ignore the point-of-view area of the user.

Description will continue with reference to FIG. 5 again. The video quality instruction unit 414 issues an instruction on the quality of the video of the user transmitted from each of the client devices 10-1 to 10-4 to the server device 40 on the basis of the degree of importance of the user of each of the client devices 10-1 to 10-4. At this time, as described above, the video quality instruction unit 414 can forcibly issue an instruction on the quality of the video of the user transmitted from each of the client devices 10-1 to 10-4 to the server device 40 to each of the client devices 10-1 to 10-4.

The video quality adjustment unit 415 adjusts the quality of the video of the user transmitted from the server device 40 to each of the client devices 10-1 to 10-4 on the basis of the degree of importance of each of the client devices 10-1 to 10-4.

The video compression unit 416 encodes the videos of the users of the respective client devices 10-1 to 10-4 in accordance with adjustment by the video quality adjustment unit 415. The videos of the users of the respective client devices 10-1 to 10-4 may be separately encoded or may be combined in the form of a single video and be encoded for each block.

Further, in a case where time required to perform encoding exceeds predetermined necessary time, the video compression unit 416, as well as the video compression unit 214, may change encoding processing so as to reduce the time required to perform encoding. Further, the video compression unit 416 may notify the video quality adjustment unit 415 of the changed encoding processing. With this, the video quality adjustment unit 415 can control the video compression unit 416 so that the video compression unit 416 performs the changed encoding processing.

The data transmission unit 417 transmits the video of the user of each of the client devices 10-1 to 10-4 to the client devices 10-1 to 10-4. At this time, the data transmission unit 417 monitors the band of the communication line with the client devices 10-1 to 10-4, and, in a case where the band is narrower than a threshold, the data transmission unit 417 may require the video quality adjustment unit 415 to reduce the quality of the video. Further, the data transmission unit 417 may transmit sound information of each of the client devices 10-1 to 10-4 to the client devices 10-1 to 10-4.

In each of the client devices 10-1 to 10-4, the data reception unit 218 receives data transmitted from the server device 40, and the output control unit 219 displays the video of the user of each of the client devices 10-1 to 10-4 on the display unit 112. Further, in each of the client devices 10-1 to 10-4, the output control unit 219 may output the sound information received by the data reception unit 218 from a speaker (not illustrated).

Hereinabove, the functional configuration example of the server device 40 according to the embodiment of the present disclosure has been described.

[1.4. Specific Description]

Figure 7:
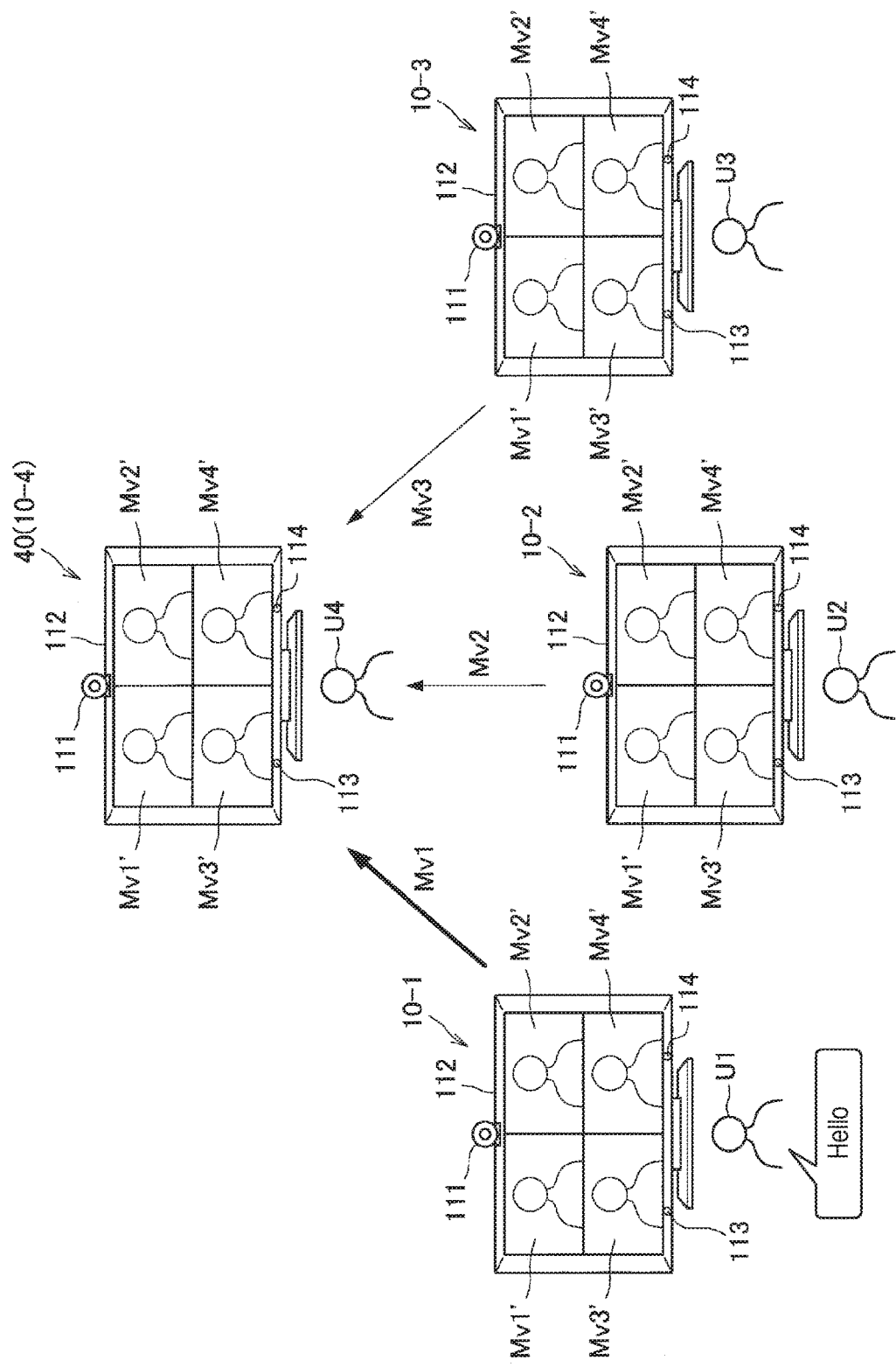
FIG. 7 is a diagram for explaining an example of a video transmitted from a client device to a server device.

Next, a function of the information processing system 1 will be described more specifically by using a specific example. FIG. 7 is a diagram for explaining an example of a video transmitted from the client device 10 to the server device 40. As illustrated in FIG. 7, in each of the client devices 10-1 to 10-4, the display unit 112 displays videos Mv1' to Mv4' received by the data reception unit 218 from the server device 40. Further, in each of the client devices 10-1 to 10-4, the speaker (not illustrated) outputs sound information received by the data reception unit 218 from the server device 40. The user of each of the client devices 10-1 to 10-4 can grasp a status of an utterer by listening to the sound information while watching the videos Mv1' to Mv4'.

When referring to FIG. 7 in more detail, a user U1 exists in an image capturing range of the camera 111 of the client device 10-1. Further, a user U2 exists in an image capturing range of the camera 111 of the client device 10-2. Further, a user U3 exists in an image capturing range of the camera 111 of the client device 10-3. Further, a user U4 exists in an image capturing range of the camera 111 of the client device 10-4. Among those users, the user U1 is an utterer who utters "Hello", and the other users are non-utterers.

Therefore, the calculation unit 212 of the client device 10-1 performs calculation so that a degree of importance of the user U1 who is an utterer is higher than degrees of importance of the non-utterers. Meanwhile, the calculation unit 212 of the client device 10-2 performs calculation so that a degree of importance of the user U2 who is a non-utterer is lower than the degree of importance of the utterer. Similarly, the calculation unit 212 of the client device 10-3 performs calculation so that a degree of importance of the user U3 who is a non-utterer is lower than the degree of importance of the utterer, and the calculation unit 212 of the client device 10-4 performs calculation so that a degree of importance of the user U4 who is a non-utterer is lower than the degree of importance of the utterer.

Then, the video quality control unit 213 of the client device 10-1 controls the video compression unit 214 so that a video quality of the user U1 who is an utterer is higher than video qualities of the non-utterers on the basis of the degree of importance of the user U1. Meanwhile, the video quality control unit 213 of the client device 10-2 controls the video compression unit 214 so that a video quality of the user U2 who is a non-utterer is lower than the video quality of the utterer on the basis of the degree of importance of the user U2.

Similarly, the video quality control unit 213 of the client device 10-3 controls the video compression unit 214 so that a video quality of the user U3 who is a non-utterer is lower than the video quality of the utterer on the basis of the degree of importance of the user U3, and the video quality control unit 213 of the client device 10-4 controls the video compression unit 214 so that a video quality of the user U4 who is a non-utterer is lower than the video quality of the utterer.

Then, in each of the client devices 10-1 to 10-4, the video compression unit 214 encodes the video in accordance with control by the video quality control unit 213, and the data transmission unit 216 transmits the video to the server device 40. As illustrated in FIG. 7, a quality of a video Mv1 transmitted from the client device 10-1 is higher than qualities of videos Mv2 to Mv4 transmitted from the client devices 10-2 to 10-4 (in FIG. 7, a thickness of each arrow shows a level of a video quality). With this, it is possible to suppress an amount of data of the videos of the users U2, U3, and U4 who are non-utterers while preventing deterioration in the video quality of the user U1 who is an utterer.

Figure 8:
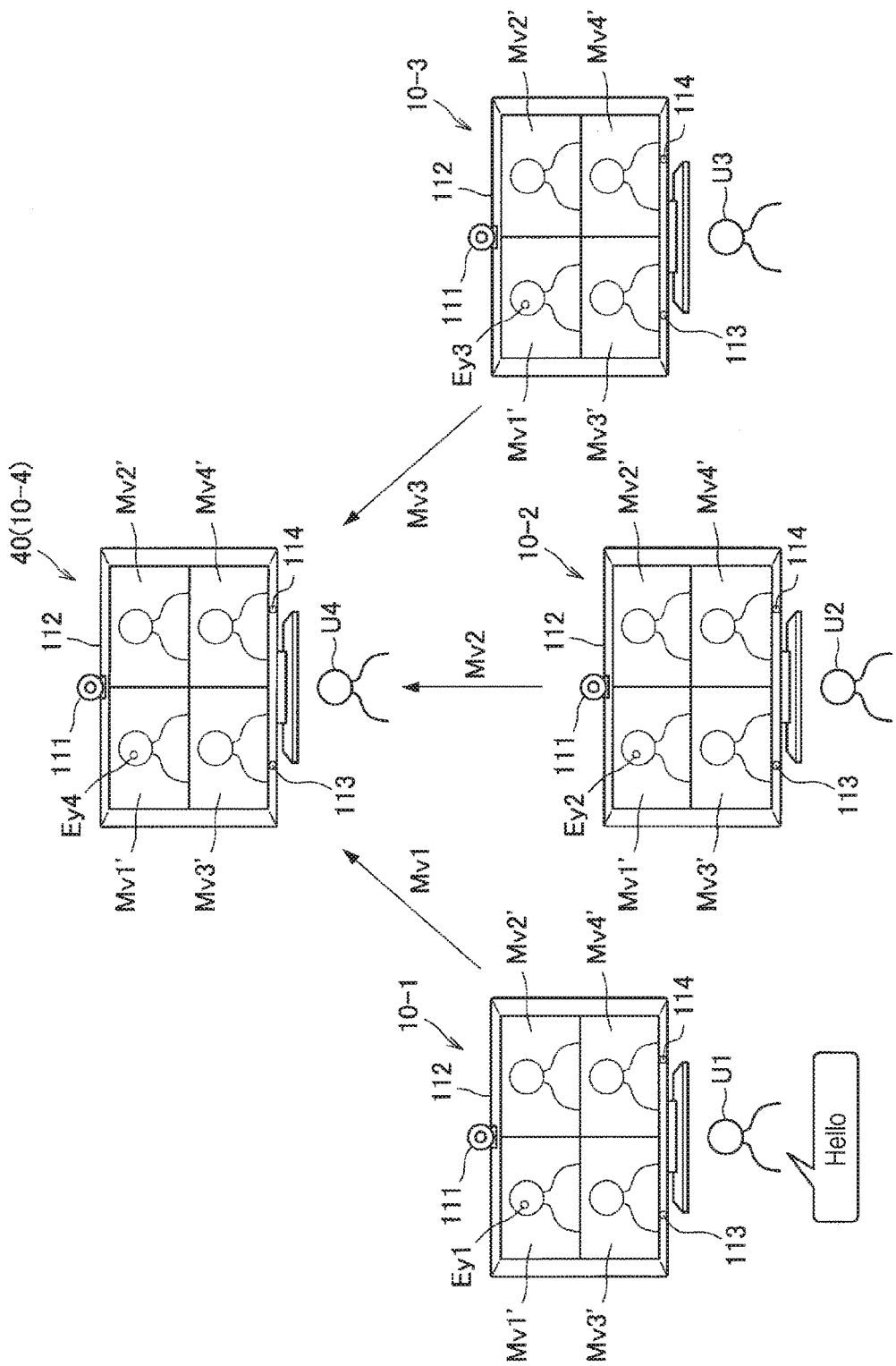
FIG. 8 is a diagram for explaining an example of point-of-view area data transmitted from a client device to a server device.

FIG. 8 is a diagram for explaining an example of the point-of-view area data 312 transmitted from the client device 10 to the server device 40. As illustrated in FIG. 8, it is assumed that, in the client device 10-1, the user U1 turns his/her line of sight on the video Mv1' (it is assumed that the line of sight is turned on a point of view Ey1). At this time, in the client device 10-1, the point-of-view area detection unit 215 detects an area in which the point of view Ey1 exists as a point-of-view area from an eye area of the user U1 captured as an image by the eye area image capturing unit 113 (in the example shown in FIG. 8, a rectangular area in an upper left part) and stores data indicating the point-of-view area as the point-of-view area data 312.

Similarly, it is assumed that, in each of the client devices 10-2 to 10-4, the users U2, U3, and U4 turn their lines of sight on the video Mv1' of the utterer (user U1) (it is assumed that the lines of sight are turned on points of view Ey2 to Ey4). At this time, in each of the client devices 10-2 to 10-4, the point-of-view area detection unit 215 detects an area in which each of the points of view Ey2 to Ey4 exists as a point-of-view area from an eye area of the user captured as an image by the eye area image capturing unit 113 (in the example illustrated in FIG. 8, a rectangular area in an upper left part) and stores data indicating the point-of-view area as the point-of-view area data 312.

Then, in each of the client devices 10-1 to 10-4, the data transmission unit 216 transmits the point-of-view area data 312 to the server device 40. The data transmission unit 216 may transmit the video of the user and the calculation result data 311 together with the point-of-view area data 312 to the server device 40. In the server device 40, the data reception unit 411 receives the point-of-view area data 312 from each of the client devices 10-1 to 10-4.

By referring to the point-of-view area data 312 received from each of the client devices 10-1 to 10-4, the data analysis unit 413 only needs to perform calculation so that the degree of importance of the user U1 appearing in the video Mv1' on which the largest number of lines of sight are turned is higher than the degrees of importance of the users U2, U3, and U4 appearing in the video Mv2', the video Mv3', and the video Mv4'. The video quality instruction unit 414 transmits, to the client devices 10-1 to 10-4, an instruction to cause the video quality of the user U1 having a higher degree of importance to be higher than the video qualities of the users U2, U3, and U4 having a lower degree of importance.

In each of the client devices 10-1 to 10-4, the video quality reception unit 217 receives the instruction on the video quality of the user, and, in a case where the video quality control unit 213 determines to follow the quality on which the instruction is issued from the server device 40, the video quality control unit 213 controls the quality of the video so that the quality becomes the quality on which the instruction is issued from the server device 40, and, in a case where the video quality control unit 213 determines not to follow the quality on which the instruction is issued from the server device 40, the video quality control unit 213 controls the quality of the video so that the quality becomes a quality calculated by the calculation unit 212. The video quality adjustment unit 415 adjusts the video quality so that the video quality of the user U1 having a higher degree of importance is higher than the video qualities of the user U2, the user U3, and the user U4 having a lower degree of importance.

The video compression unit 416 encodes the video of the user of each of the client devices 10-1 to 10-4 in accordance with adjustment by the video quality adjustment unit 415. The data transmission unit 417 transmits the video of the user of each of the client devices 10-1 to 10-4 to the client devices 10-1 to 10-4.

In each of the client devices 10-1 to 10-4, the data reception unit 218 receives data transmitted from the server device 40, and the output control unit 219 displays the videos Mv1 to Mv4 of the users of the respective client devices 10-1 to 10-4 on the display unit 112. Further, in a case where sound information is collected by the microphone in each of the client devices 10-1 to 10-4 and is transmitted to the server device 40, the output control unit 219 may output those pieces of sound information from the speaker (not illustrated).

Figure 9:
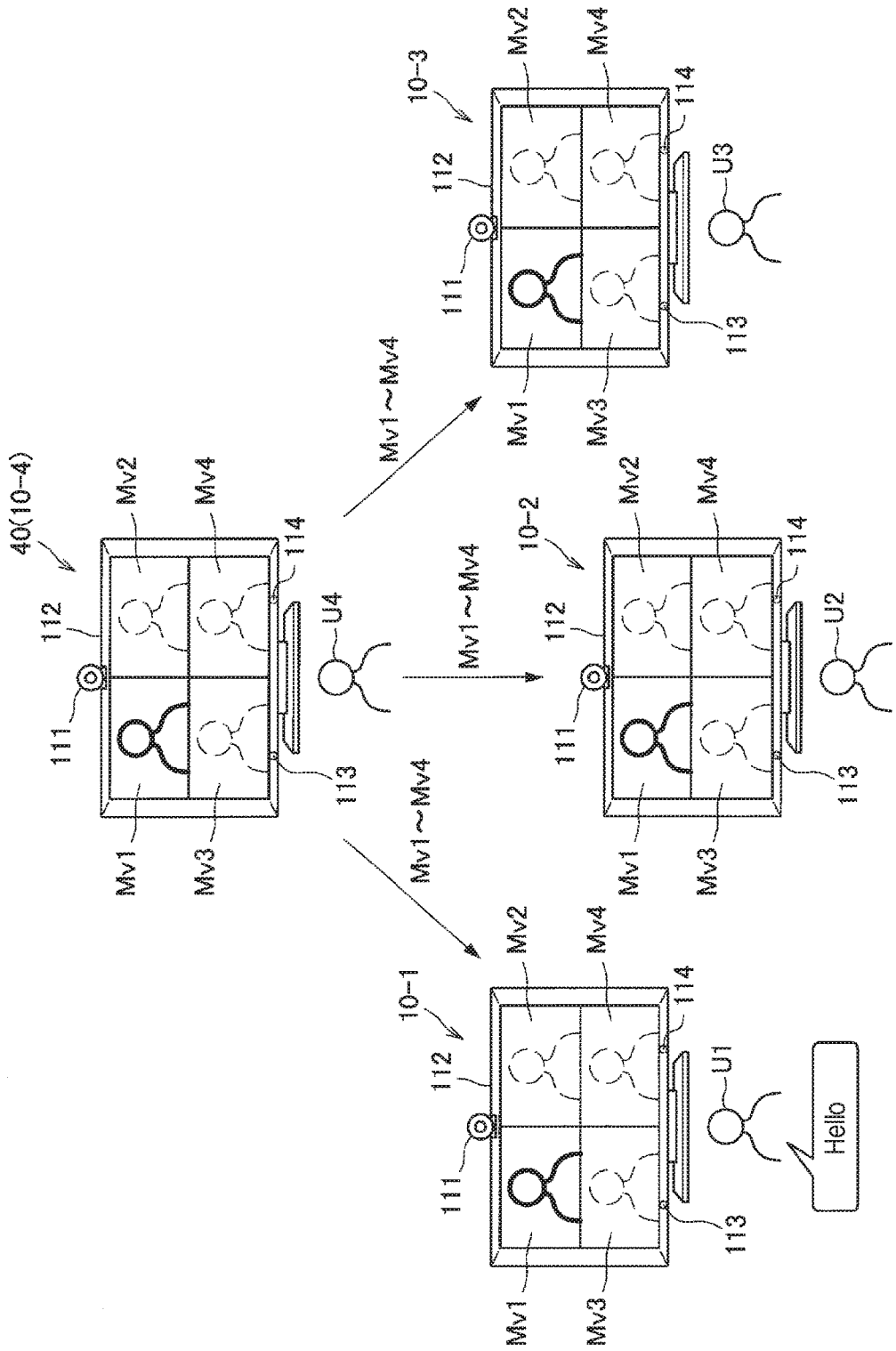
FIG. 9 is a diagram illustrating a display example of a video of a user of a client device.

FIG. 9 is a diagram illustrating a display example of the videos Mv1 to Mv4 of the users of the respective client devices 10-1 to 10-4. As illustrated in FIG. 9, the videos Mv1 to Mv4 are transmitted from the server device 40 to each of the client devices 10-1 to 10-4. Further, as illustrated in FIG. 9, in each of the client devices 10-1 to 10-4, the output control unit 219 displays the videos Mv1 to Mv4 of the users of the respective client devices 10-1 to 10-4 on the display unit 112. As described above, the quality of the video Mv1 of the user U1 is higher than the qualities of the videos Mv2 to Mv4 of the users U2, U3, and U4 (in FIG. 9, a thickness of a user appearing in each of the videos Mv1 to Mv4 shows a level of a video quality).

Hereinabove, the function of the information processing system 1 has been specifically described by using a specific example.

[1.5. Operation Example of Client Device]

Figure 10:
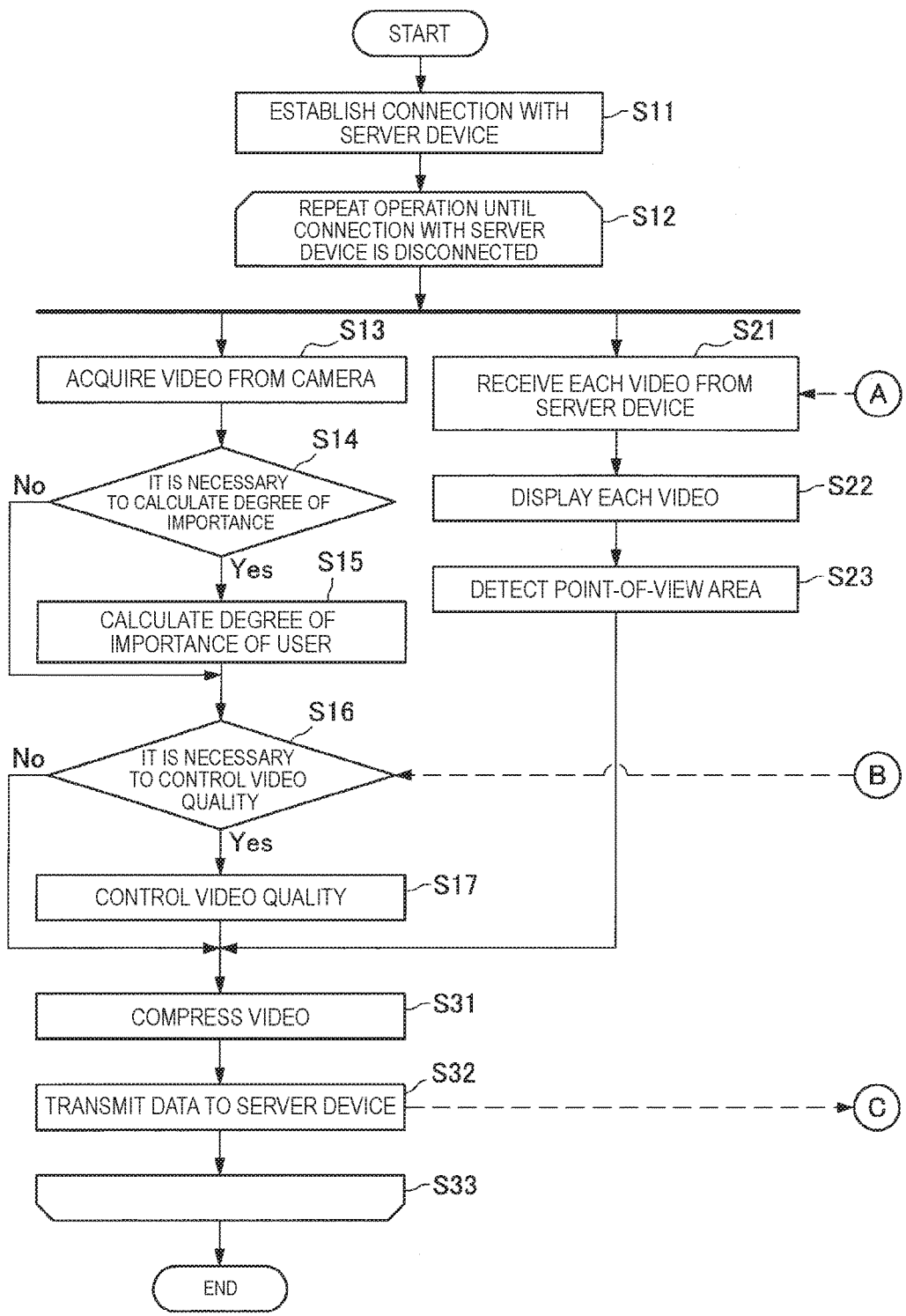
FIG. 10 is a flowchart showing a flow of operation of a client device according to an embodiment of the present disclosure.

Next, a flow of operation of the client device 10 according to an embodiment of the present disclosure will be described. FIG. 10 is a flowchart showing the flow of the operation of the client device 10 according to the embodiment of the present disclosure. Note that the flowchart in FIG. 10 is merely an example of the flow of the operation of the client device 10 according to the embodiment of the present disclosure, and therefore the flow of operation of the client device 10 according to the embodiment of the present disclosure is not limited to the example shown in the flowchart in FIG. 10.

As shown in FIG. 10, the client device 10 establishes connection with the server device 40 (S11) and repeats operation from S13 to S32 and operation from S21 to S32 until connection with the server device 40 is disconnected (S12). The video acquisition unit 211 acquires a video from the camera 111 (S13), and, in a case where it is unnecessary to calculate a degree of importance ("No" in S14), the calculation unit 212 proceeds to S16. On the contrary, in a case where it is necessary to calculate a degree of importance ("Yes" in S14), the calculation unit 212 calculates a degree of importance of a user (S15) and proceeds to S16.

Then, in a case where it is unnecessary to control a video quality ("No" in S16), the video quality control unit 213 proceeds to S31. On the contrary, in a case where it is necessary to control a video quality ("Yes" in S16), the video quality control unit 213 controls the video quality (S17) and proceeds to S31. Meanwhile, the data reception unit 218 receives each video transmitted from the server device 40 (SS21), and the output control unit 219 displays each video on the display unit 112 (S22). The user turns his/her line of sight on any one of the displayed videos. The point-of-view area detection unit 215 detects a point-of-view area of the user (S23) and proceeds to S31.

Then, the video compression unit 416 compresses (encodes) the video (S31), and the data transmission unit 417 transmits data (video compressed (encoded) by the video compression unit 416, point-of-view area data, calculation result data of degree of importance, and the like) to the server device 40 (S32). S33 corresponds to an end of the above repeated operation, and, when the repeated operation is terminated, the operation shown in this flowchart is also terminated.

Hereinabove, the flow of the operation of the client device 10 according to the embodiment of the present disclosure has been described.

[1.6. Operation Example of Server Device]

Figure 11:
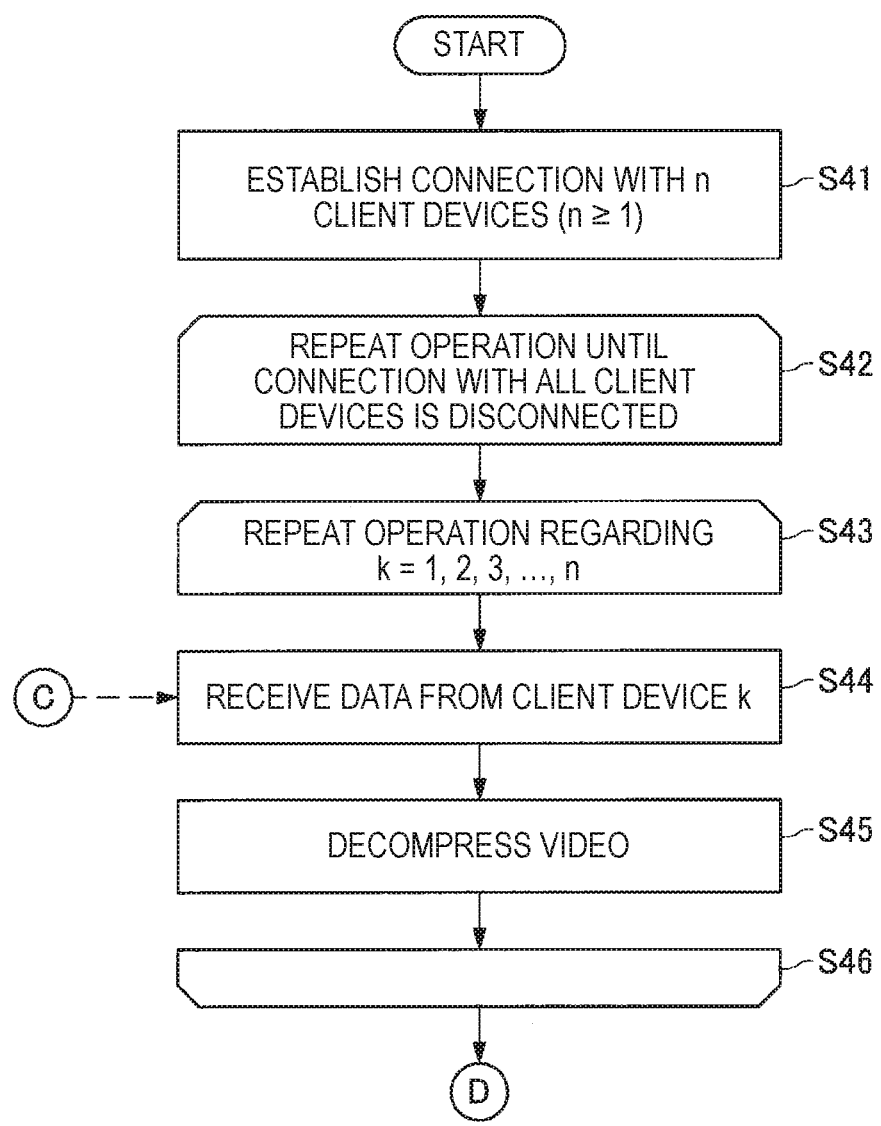
FIG. 11 is a flowchart showing a flow of operation of a server device according to an embodiment of the present disclosure.
Figure 12:
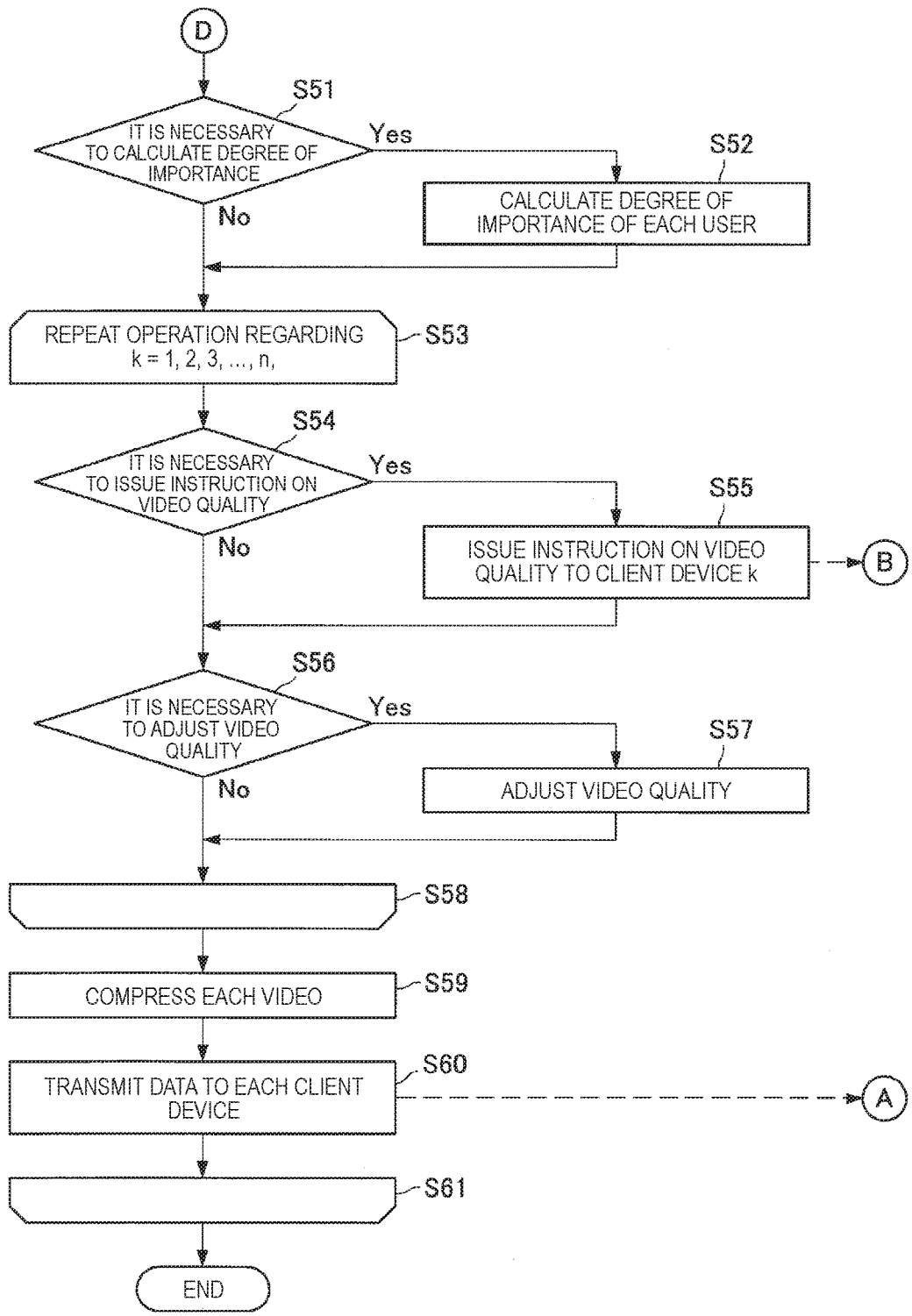
FIG. 12 is a flowchart showing a flow of operation of a server device according to an embodiment of the present disclosure.

Next, a flow of operation of the server device 40 according to an embodiment of the present disclosure will be described. FIGS. 11 and 12 are flowcharts showing the flow of the operation of the server device 40 according to the embodiment of the present disclosure. Note that the flowcharts in FIGS. 11 and 12 are merely examples of the flow of the operation of the server device 40 according to the embodiment of the present disclosure, and therefore the flow of the operation of the server device 40 according to the embodiment of the present disclosure is not limited to the examples shown in the flowcharts in FIGS. 11 and 12.

As shown in FIG. 11, the server device 40 establishes connection with n client devices 10 (S41) and repeats operation from S43 to S60 until connection with all the client devices 10 is disconnected. In the repeated operation, operation from S44 to S45 is repeated regarding k=1, 2, 3, . . . , n (S43). First, in the server device 40, the data reception unit 411 receives data (video, point-of-view area data, calculation result data, and the like) from a client device k (S44). Then, the video decompression unit 412 decompresses (decodes) the received video (S45). S46 corresponds to an end of the above repeated operation.

Then, in a case where it is unnecessary to calculate a degree of importance ("No" in S51), the data analysis unit 413 proceeds to S53. On the contrary, in a case where it is necessary to calculate a degree of importance ("Yes" in S51), the data analysis unit 413 calculates a degree of importance of a user (S52) and proceeds to S53. Regarding k=1, 2, 3, . . . , n, the server device 40 repeats operation from S54 to S56 (or S57) (S53). In a case where it is unnecessary to issue an instruction on a video quality ("No" in S54), the video quality instruction unit 414 proceeds to S56. On the contrary, in a case where it is necessary to issue an instruction on a video quality ("Yes" in S54), the video quality instruction unit 414 issues an instruction on a video quality to the client device k (S55).

Further, in a case where it is unnecessary to adjust the video quality ("No" in S56), the video quality adjustment unit 415 proceeds to S58. On the contrary, in a case where it is necessary to adjust the video quality ("Yes" in S56), the video quality adjustment unit 415 adjusts the video quality (S57) and proceeds to S58. S58 corresponds to an end of the above repeated operation. Then, the video compression unit 416 compresses (encodes) each video in accordance with adjustment by the video quality adjustment unit 415 (S59), and the data transmission unit 417 transmits data (each video) to each of the client devices 10-1 to 10-4 (S60). S61 corresponds to an end of the above repeated operation. When the repeated operation is terminated, the operation shown in this flowchart is also terminated.

Hereinabove, the flow of the operation of the server device 40 according to the embodiment of the present disclosure has been described.

[1.7. Hardware Configuration Example of Client Device]

Figure 13:
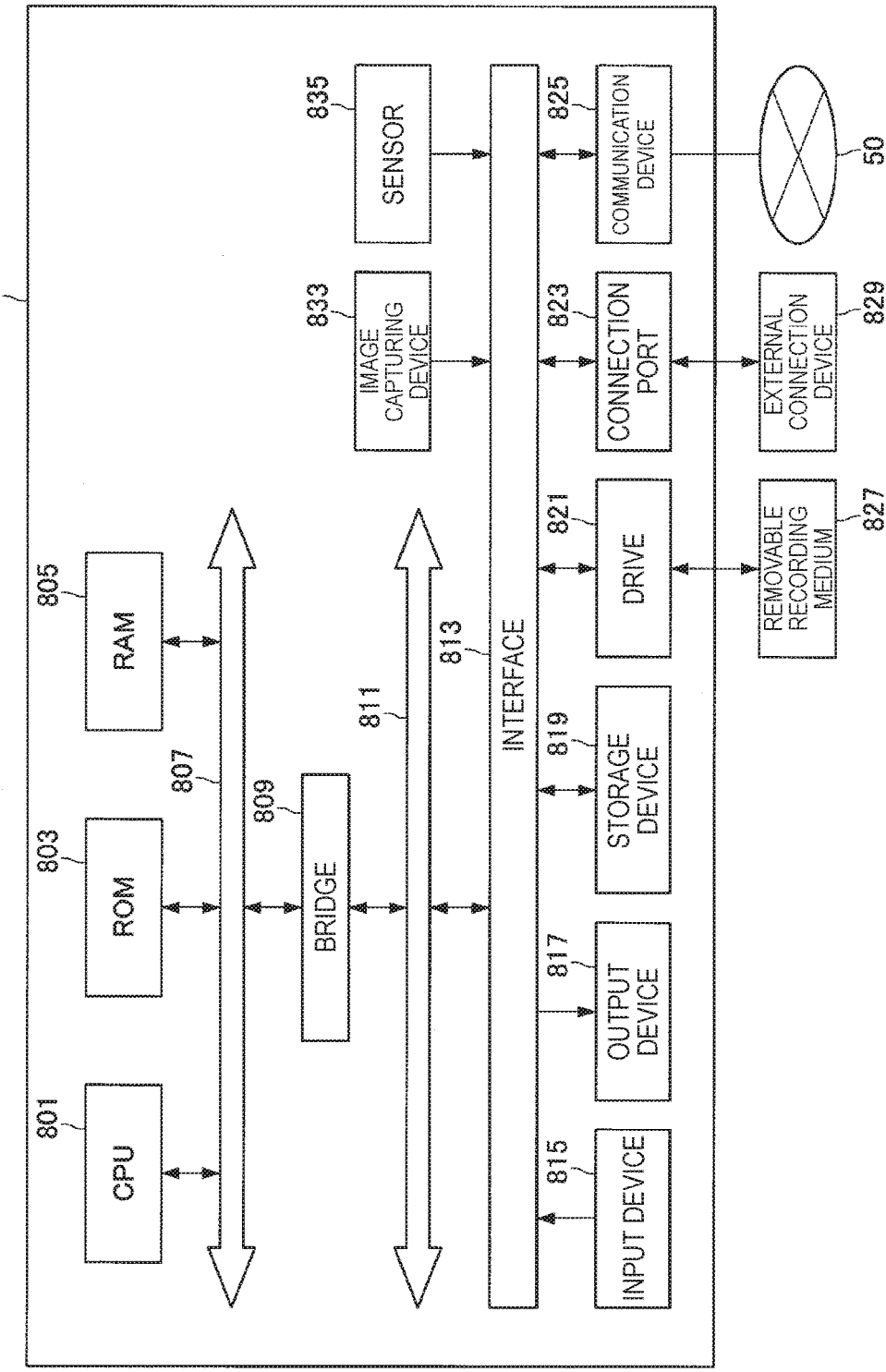
FIG. 13 is a block diagram illustrating a hardware configuration example of a client device according to an embodiment of the present disclosure.

Next, the hardware configuration of the client device 10 according to an embodiment of the present disclosure is described with reference to FIG. 13. FIG. 13 is a block diagram illustrating a hardware configuration example of the client device 10 according to an embodiment of the present disclosure.

As illustrated in FIG. 13, the client device 10 includes a central processing unit (CPU) 801, a read only memory (ROM) 803, and a random access memory (RAM) 805. In addition, the client device 10 may include a host bus 807, a bridge 809, an external bus 811, an interface 813, an input device 815, an output device 817, a storage device 819, a drive 821, a connection port 823, and a communication device 825. The client device 10 may further include an image capturing device 833 and a sensor 835 as necessary. In conjunction with, or in place of, the CPU 801, the client device 10 may have a processing circuit called a digital signal processor (DSP) or application specific integrated circuit (ASIC).

The CPU 801 functions as an arithmetic processing unit and a control device, and controls the overall operation in the client device 10 or a part thereof in accordance with various programs recorded in the ROM 803, the RAM 805, the storage device 819, or the removable recording medium 827. The ROM 803 stores, for example, programs and operation parameters used by the CPU 801. The RAM 805 temporarily stores, for example, programs to be used in the execution by the CPU 801 and parameters that change as appropriate in executing the programs. The CPU 801, the ROM 803, and the RAM 805 are connected with each other via the host bus 807 that is composed of an internal bus such as a CPU bus. Furthermore, the host bus 807 is connected to the external bus 811 such as peripheral component interconnect (PCI)/interface bus via the bridge 809.

The input device 815 is, for example, a device operated by a user, such as a mouse, a keyboard, a touch panel, a button, a switch, and a lever. The input device 815 may include a microphone for detecting user's voice. The input device 815 may be, for example, a remote control device using infrared rays or other radio waves, or may be an external connection device 829 such as a cellular phone conforming to the operation of the client device 10. The input device 815 includes an input control circuit that generates an input signal on the basis of the information input by the user and outputs it to the CPU 801. The user inputs various data to the client device 10 and instructs the client device 10 to perform a processing operation by operating the input device 815. In addition, the image capturing device 833, which will be described later, can also function as an input device by capturing the movement of the user's hand or finger, and the like. In this case, the pointing position may be determined depending on the motion of the hand or the direction of the finger.

The output device 817 is composed of a device capable of notifying visually or audibly the user of the acquired information. The output device 817 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 817 outputs the result obtained by the processing of the client device 10 as a video such as a text or an image, or outputs it as audio such as a voice or sound. In addition, the output device 817 may include, for example, a light for lighting up the surroundings.

The storage device 819 is a data storage device configured as an example of a storage portion of the client device 10. The storage device 819 is composed of, for example, a magnetic storage device such as hard disk drives (HDDs), a semiconductor storage device, an optical storage device, and a magneto-optical storage device. The storage device 819 stores programs executed by the CPU 801, various data, various types of data obtained from the outside, and the like.

The drive 821 is a reader-writer for the removable recording medium 827 such as a magnetic disk, an optical disk, a magneto-optical disk, and a semiconductor memory, and is incorporated in the client device 10 or externally attached thereto. The drive 821 reads the information recorded in the attached removable recording medium 827 and outputs it to the RAM 805. In addition, the drive 821 writes in the attached removable recording medium 827.

The connection port 823 is a port for directly connecting the device to the client device 10. The connection port 823 may be, for example, a universal serial bus (USB) port, an IEEE 1394 port, or a small computer system interface (SCSI) port. In addition, the connection port 823 may be, for example, an RS-232C port, an optical audio terminal, or high-definition multimedia interface (HDMI, registered trademark) port. The external connection device 829 is connected to the connection port 823, and thus various kinds of data can be exchanged between the client device 10 and the external connection device 829.

The communication device 825 is, for example, a communication interface composed of a communication device or the like, which is used to be connected to the communication network 50. The communication device 825 may be, for example, a communication card for wired or wireless local area network (LAN), Bluetooth (registered trademark), or wireless USB (WUSB). In addition, the communication device 825 may be, for example, a router for optical communication, a router for asymmetric digital subscriber line (ADSL), or a modem for various communications. The communication device 825 transmits and receives signals or the like using a predetermined protocol such as TCP/IP, for example, with the Internet or other communication devices. In addition, the communication network 50 connected to the communication device 825 is a network connected by wire or wireless, and is, for example, the Internet, home LAN, infrared communication, radio wave communication, satellite communication, or the like.

The image capturing device 833 captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 833 may capture a still image or a moving image.

The sensor 835 is, for example, various sensors such as an accelerometer, a gyro sensor, a geomagnetic sensor, a photosensor, and a sound sensor. The sensor 835 acquires information on the state of the client device 10 itself, such as the attitude of the casing of the client device 10, and information on the surrounding environment of the client device 10 such as brightness or noise around the client device 10. The sensor 835 may also include a GPS sensor, which receives global positioning system (GPS) signals and measures the latitude, longitude, and altitude of the device.

The above description is given as to the example of the hardware configuration of the client device 10. Each of the components described above may be configured using a general-purpose member, or may be configured with hardware dedicated to the function of each component. Such a configuration can be changed appropriately depending on the technical level at the time of implementation.

The above description is given as to the hardware configuration example of the client device 10 according to an embodiment of the present disclosure.

[1.8. Hardware Configuration Example of Server Device]

Figure 14:
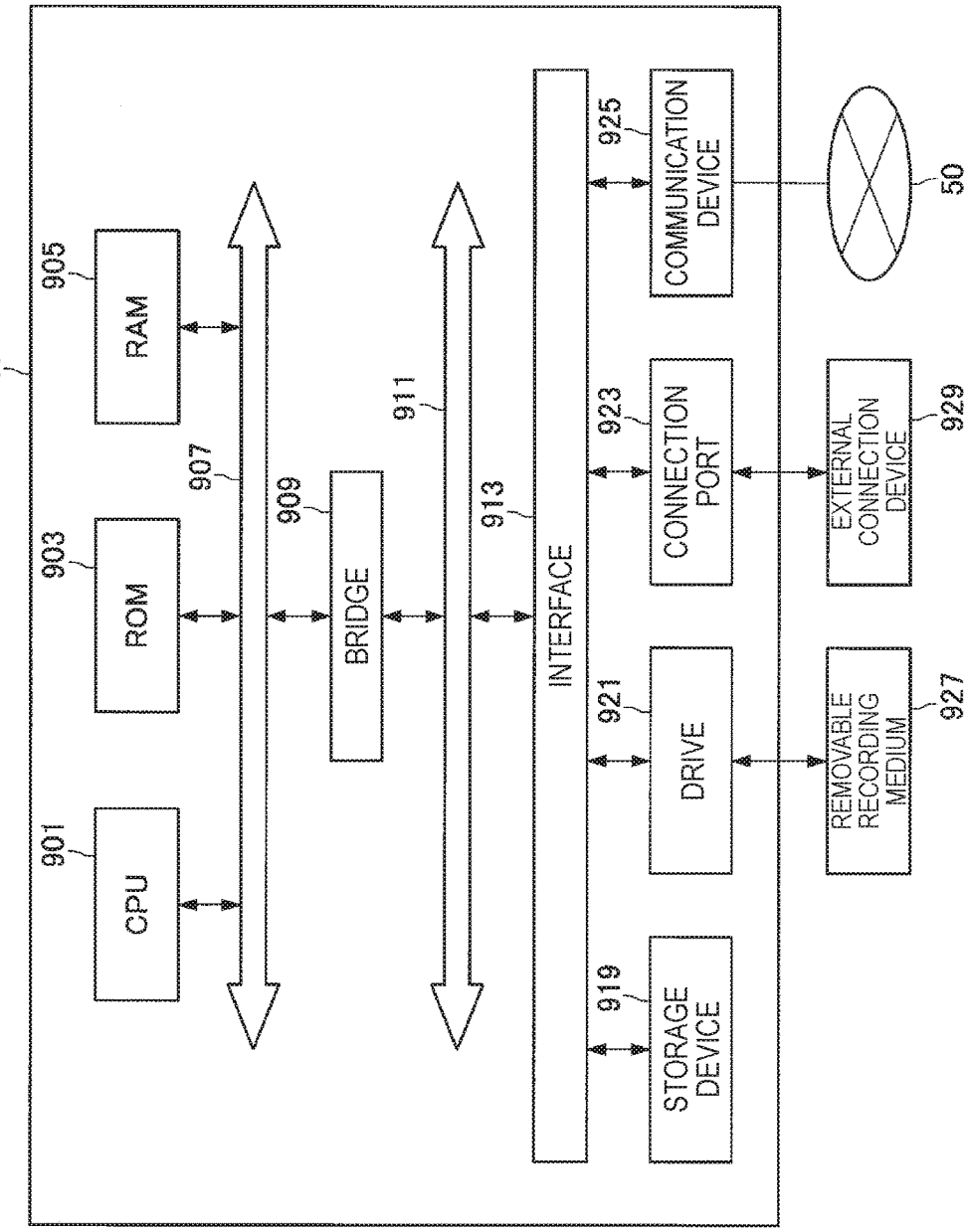
FIG. 14 is a block diagram illustrating a hardware configuration example of a server device according to an embodiment of the present disclosure.

Next, the hardware configuration of the server device 40 according to an embodiment of the present disclosure is described with reference to FIG. 14. FIG. 14 is a block diagram illustrating a hardware configuration example of the server device 40 according to an embodiment of the present disclosure.

As illustrated in FIG. 14, the server device 40 includes a central processing unit (CPU) 901, a read only memory (ROM) 903, and a random access memory (RAM) 905. In addition, the server device 40 may include a host bus 907, a bridge 909, an external bus 911, an interface 913, a storage device 919, a drive 921, a connection port 923, and a communication device 925. In conjunction with, or in place of, the CPU 901, the server device 40 may have a processing circuit called a digital signal processor (DSP) or application specific integrated circuit (ASIC).

The CPU 901 functions as an arithmetic processing unit and a control device, and controls the overall operation in the server device 40 or a part thereof in accordance with various programs recorded in the ROM 903, the RAM 905, the storage device 919, or a removable recording medium 927. The ROM 903 stores, for example, programs and operation parameters used by the CPU 901. The RAM 905 temporarily stores, for example, programs to be used in the execution by the CPU 901 and parameters that change as appropriate in executing the programs. The CPU 901, the ROM 903, and the RAM 905 are connected with each other via a host bus 907 that is composed of an internal bus such as a CPU bus. Furthermore, the host bus 907 is connected to an external bus 911 such as peripheral component interconnect (PCI)/interface bus via a bridge 909.

The storage device 919 is a data storage device configured as an example of a storage portion of the server device 40. The storage device 919 is composed of, for example, a magnetic storage device such as hard disk drives (HDDs), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the server device 40 or externally attached thereto. The drive 921 reads the information recorded in the attached removable recording medium 927 and outputs it to the RAM 905. In addition, the drive 921 writes in the attached removable recording medium 927.

The connection port 923 is a port for directly connecting the device to the server device 40. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. An external connection device 929 is connected to the connection port 923, and thus various kinds of data can be exchanged between the server device 40 and the external connection device 929.

The communication device 925 is, for example, a communication interface composed of a communication device or the like, which is used to be connected to the communication network 50. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 50 connected to the communication device 925 is a network connected by wire or wireless, and is, for example, the Internet, home LAN, infrared communication, radio wave communication, satellite communication, or the like.

The above description is given as to the example of the hardware configuration of the server device 40. Each of the components described above may be configured using a general-purpose member, or may be configured with hardware dedicated to the function of each component. Such a configuration can be changed appropriately depending on the technical level at the time of implementation.

The above description is given as to the hardware configuration example of the server device 40 according to an embodiment of the present disclosure.

[2. Conclusion]

As described above, according to an embodiment of the present disclosure, there is provided an information processing device including the video quality control unit 213 for controlling a quality of a video of a user transmitted from the client device 10 to the server device 40 on the basis of a degree of importance of the user based on whether or not the user of the client device 10 makes utterance. With this configuration, it is possible to provide a technology capable of preventing deterioration in a video quality desired by a user while suppressing an amount of data of a video transmitted to a communication line.

Further, considering a point in which a video conference using a high-resolution video has been diffused, a point in which participation of a plurality of locations in a video conference has been generally performed, a point in which video conferences using a wireless network have been increased, and the like, it is essential to suppress a band of a communication line. For example, in a case where a video conference is performed in a plurality of locations, it is possible to remarkably reduce the band of the communication line by reducing qualities of videos of users other than an utterer. It is considered that the present technology can be used in various situations as a new method of controlling a transmission band.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to create a program for causing the hardware such as CPU, ROM and RAM incorporated in the computer to execute functions equivalent to those of the client device 10 as described above. In addition, a computer-readable recording medium on which the program is recorded can also be provided.

Furthermore, for example, it is possible to create a program for causing the hardware such as CPU, ROM and RAM incorporated in the computer to execute functions equivalent to those of the server device 40 as described above. In addition, a computer-readable recording medium on which the program is recorded can also be provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including a video quality control unit configured to control, on the basis of a degree of importance of a user based on whether or not the user of a client device makes utterance, a quality of a video of the user transmitted from the client device to a server device.

(2)

The information processing device according to (1), in which the video quality control unit increases the quality of the video of the user as the degree of importance of the user is higher.

(3)

The information processing device according to (1) or (2), including a calculation unit configured to calculate the degree of importance of the user on the basis of whether or not the user of the client device makes utterance.

(4)

The information processing device according to (3), in which the calculation unit determines whether or not the user of the client device makes utterance on the basis of a video captured by a camera or sound information collected by a microphone.

(5)

The information processing device according to (3) or (4), in which the calculation unit increases the degree of importance of the user in a case where the user of the client device makes utterance, as compared to a case where the user does not make utterance.

(6)

The information processing device according to any one of (3) to (5), in which the calculation unit calculates the degree of importance of the user on the basis of at least one of a length of continuous utterance made by the user of the client device, content of an utterance, and an interval between utterances.

(7)

The information processing device according to any one of (1) to (6), in which the video quality control unit controls the quality of the video of the user transmitted from the client device to the server device further on the basis of a band of a communication line of the video of the user of the client device.

(8)

The information processing device according to any one of (1) to (7), in which the information processing device is incorporated into one of or is distributed and incorporated into two or more of the client device, the server device, and the client device and one or more external devices existing outside the client device.

(9)

An information processing method including controlling, on the basis of a degree of importance of a user based on whether or not the user of a client device makes utterance, a quality of a video of the user transmitted from the client device to a server device.

(10)

A client device including a video quality control unit configured to control, on the basis of a degree of importance of a user based on whether or not the user makes utterance, a quality of a video of the user transmitted to a server device.

(11)

A server device including:

a data analysis unit configured to calculate, regarding each of a plurality of client devices, a degree of importance of a user on the basis of whether or not the user makes utterance; and a video quality instruction unit configured to issue, regarding each of the plurality of client devices, an instruction on a quality of a video of the user transmitted from the client device to the server device on the basis of the degree of importance.

(12)

The server device according to (11), in which, regarding each of the plurality of client devices, the data analysis unit calculates a new degree of importance of the user by multiplying the degree of importance based on whether or not the user makes utterance by a weighting coefficient corresponding to the client device.

(13)

The server device according to (11) or (12), in which, regarding each of the plurality of client devices, the data analysis unit calculates the degree of importance of the user on the basis of a line of sight of the user of each of the plurality of client devices.

(14)

The server device according to (13), in which the data analysis unit increases a degree of importance of a user appearing in a video on which a larger number of the lines of sight are turned.

(15)

The server device according to any one of (11) to (14), including a video adjustment unit configured to adjust, regarding each of the plurality of client devices, the quality of the video of the user transmitted from the server device to the client device on the basis of the degree of importance.

(16)

An information processing system including:

a plurality of client devices; and a server device, in which each of the plurality of client devices includes a video quality control unit configured to control, on the basis of a degree of importance of a user based on whether or not the user makes utterance, a quality of a video of the user transmitted from the client device to the server device.

(17)

The information processing system according to (16), in which the server device a data analysis unit configured to calculate, regarding each of the plurality of client devices, the degree of importance of the user on the basis of whether or not the user makes utterance, and a video quality instruction unit configured to issue, regarding each of the plurality of client devices, an instruction on the quality of the video of the user transmitted from the client device to the server device on the basis of the degree of importance.

(18)

The information processing system according to (17), in which the video quality control unit determines whether to follow the quality of the video of the user on which the instruction is issued from the server device.

(19)

The information processing system according to (18), in which the video quality control unit determines whether to follow the quality of the video on which the instruction is issued from the server device on the basis of a number of the client devices connected to the server device.

(20) The information processing system according to (18), in which the video quality control unit determines whether to follow the quality of the video on which the instruction is issued from the server device on the basis of a line of sight of the user of each of the plurality of client devices.

REFERENCE SIGNS LIST 1 (1A to 1D) information processing system
10 client device (terminal)
40 server device
111 camera
112 display unit
113 eye area image capturing unit
114 microphone
211 video acquisition unit
212 calculation unit
213 video quality control unit
214 video compression unit
215 point-of-view area detection unit
216 data transmission unit
217 video quality reception unit
218 data reception unit
219 output control unit
311 calculation result data
312 point-of-view area data
411 data reception unit
412 video decompression unit
413 data analysis unit
414 video quality instruction unit
415 video quality adjustment unit
416 video compression unit
417 data transmission unit
Mv1 to Mv4 video
Mv1' to Mv4' video
U1 to U4 user
Ey (Ey1 to Ey4) point of view

The invention claimed is:

1. An information processing device, comprising:
a calculation unit configured to calculate a degree of importance of a user based on at least one of a first time period of an utterance associated with the user or a second time period between two consecutive utterances associated with the user,
wherein the user is associated with a client device; and
a video quality control unit configured to control a quality of a video of the user based on the calculated degree of importance of the user,
wherein the client device transmits the video of the user to a server device.

2. The information processing device according to claim 1,
wherein the video quality control unit is further configured to increase the quality of the video of the user based on increase in the degree of importance of the user.

3. The information processing device according to claim 1,
wherein the calculation unit is further configured to determine the utterance associated with the user based on at least one of a captured video or collected sound information.

4. The information processing device according to claim 1,
wherein the calculation unit is further configured to increase the degree of importance of the user based on amount of the utterance associated with the user.

5. The information processing device according to claim 1,
wherein the video quality control unit is further configured to control the quality of the video of the user based on a band of a communication line with the server device.

6. The information processing device according to claim 1,
wherein the information processing device is one of integrated into one of the client device, the server device, or at least one external device or is distributed into the at least two of the client device, the server device, or the at least one external device, wherein the at least one external device is outside the client device.

7. An information processing method, comprising:
calculating a degree of importance of a user based on at least one of a first time period of an utterance associated with the user or a second time period between two consecutive utterances associated with the user,
wherein the user is associated with a client device; and
controlling a quality of a video of the user based on the calculated degree of importance of the user,
wherein the client device transmits the video of the user to a server device.

8. A client device, comprising:
a calculation unit configured to calculate a degree of importance of a user based on at least one of a first time period of an utterance associated with the user or a second time period between two consecutive utterances associated with the user,
wherein the user is associated with the client device; and
a video quality control unit configured to control a quality of a video of the user based on the calculated degree of importance of the user,
wherein the client device is configured to transmit the video of the user to a server device.

9. A server device, comprising:
a data analysis unit configured to calculate, for each of a plurality of client devices, a first degree of importance of a first user based on at least one of a first time period of an utterance associated with the first user or a second time period between two consecutive utterances associated with the first user; and
a video quality instruction unit configured to issue, for each of the plurality of client devices, an instruction on a quality of a first video of the first user based on the calculated first degree of importance,
wherein each of the plurality of client devices transmits the first video of the first user to the server device.

10. The server device according to claim 9,
wherein, the data analysis unit is further configured to calculate, for each of the plurality of client devices, a new degree of importance of the first user based on multiplication of the first degree of importance by a weighting coefficient.

11. The server device according to claim 9,
wherein, the data analysis unit is further configured to calculate, for each of the plurality of client devices, the first degree of importance of the first user based on a line of sight of the first user of each of the plurality of client devices.

12. The server device according to claim 11,
wherein the data analysis unit is further configured to increase a second degree of importance of a second user viewable in a second video, wherein the second video corresponds to a specific count of the line of sight.

13. The server device according to claim 9, comprising
a video adjustment unit configured to adjust, for each of the plurality of client devices, a quality of a second video of the first user,
wherein the server device is configured to transmit the second video to each of the plurality of client devices based on the first degree of importance.

14. An information processing system, comprising:
a plurality of client devices; and
a server device,
wherein each of the plurality of client devices includes:
a calculation unit configured to calculate a degree of importance of a user based on at least one of a first time period of an utterance associated with the user or a second time period between two consecutive utterances associated with the user,
wherein the user is associated with a client device; and
a video quality control unit configured to control a quality of a video of the user based on the calculated degree of importance of the user,
wherein each of the plurality of client devices is configured to transmit the video of the user to the server device.

15. The information processing system according to claim 14,
wherein the server device comprises:
a data analysis unit configured to calculate, for each of the plurality of client devices, the degree of importance of the user based on the at least one of a first time period of an utterance associated with the user or a second time period between two consecutive utterances associated with the user; and
a video quality instruction unit configured to issue, for each of the plurality of client devices, an instruction on the quality of the video of the user based on the calculated degree of importance of the user,
wherein each of the plurality of client devices is configured to transmit the video of the user to the server device.

16. The information processing system according to claim 15,
wherein the video quality control unit is further configured to determine a validity of the quality of the video of the user based on the issued instruction.

17. The information processing system according to claim 16,
wherein the video quality control unit is further configured to determine the validity of the quality of the video based on a count of the plurality of client devices connected to the server device.

18. The information processing system according to claim 16,
wherein the video quality control unit is further configured to determine the validity of the quality of the video based on a line of sight of the user of each of the plurality of client devices.

* * * * *